US010624050B2

(12) United States Patent
Chae

(10) Patent No.: US 10,624,050 B2
(45) Date of Patent: *Apr. 14, 2020

(54) METHOD AND APPARATUS FOR GENERATING DEVICE-TO-DEVICE TERMINAL SIGNAL IN WIRELESS COMMUNICATION SYSTEM

(71) Applicant: LG ELECTRONICS INC., Seoul (KR)

(72) Inventor: Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,172

(22) Filed: Jul. 13, 2018

(65) Prior Publication Data

US 2018/0324733 A1    Nov. 8, 2018

Related U.S. Application Data

(63) Continuation of application No. 15/121,550, filed as application No. PCT/KR2015/001790 on Feb. 25, 2015, now Pat. No. 10,034,257.

(60) Provisional application No. 61/944,553, filed on Feb. 25, 2014.

(51) Int. Cl.
*H04L 27/28*    (2006.01)
*H04W 56/00*    (2009.01)
*H04L 5/00*    (2006.01)
*H04L 27/26*    (2006.01)

(52) U.S. Cl.
CPC ....... *H04W 56/0015* (2013.01); *H04L 5/0048* (2013.01); *H04L 5/0069* (2013.01); *H04L 27/2613* (2013.01); *H04L 27/2628* (2013.01); *H04W 56/0095* (2013.01); *H04L 5/0064* (2013.01)

(58) Field of Classification Search
None
See application file for complete search history.

(56) References Cited

U.S. PATENT DOCUMENTS

| | | | |
|---|---|---|---|
| 6,289,000 B1 | 9/2001 | Yonge, III | |
| 6,577,630 B1 | 6/2003 | Markwalter et al. | |
| 6,671,284 B1 | 12/2003 | Yonge, III et al. | |
| 6,907,044 B1 | 6/2005 | Yonge, III et al. | |
| 7,145,955 B1 * | 12/2006 | Bohnke | H04L 27/2613 375/260 |

(Continued)

FOREIGN PATENT DOCUMENTS

WO    WO 2013/155253 A1    10/2013

*Primary Examiner* — Jay P Patel
(74) *Attorney, Agent, or Firm* — Birch, Stewart, Kolasch & Birch, LLP

(57) ABSTRACT

A method of generating a device-to-device (D2D) signal by a user equipment (UE) in a wireless communication system, the method includes mapping a sequence for an automatic gain control (AGC) preamble to a resource element; and generating the AGC preamble by performing an inverse fast Fourier transform (IFFT) on the sequence for the AGC preamble mapped to the resource element, further the sequence for the AGC preamble is repeated N times when mapped to the resource element, and also N is determined based on at least one of a system frequency bandwidth or a transmission frequency bandwidth.

13 Claims, 5 Drawing Sheets

(a)

(b)

(56) References Cited

U.S. PATENT DOCUMENTS

| | | |
|---|---|---|
| 7,469,297 B1 | 12/2008 | Kostoff, II et al. |
| 2004/0202102 A1* | 10/2004 | Kim ..................... H03G 3/3089 370/208 |
| 2005/0169397 A1* | 8/2005 | Goel ........................ H04B 7/02 375/267 |
| 2006/0034389 A1* | 2/2006 | Aoki ..................... H04W 52/52 375/299 |
| 2008/0056394 A1* | 3/2008 | Lee ....................... H03G 3/3078 375/260 |
| 2008/0240031 A1 | 10/2008 | Nassiri-Toussi et al. |
| 2009/0310524 A1 | 12/2009 | Katsube et al. |
| 2009/0323563 A1 | 12/2009 | Ho et al. |
| 2010/0061493 A1 | 3/2010 | Takahashi et al. |
| 2010/0316140 A1 | 12/2010 | Razazian et al. |
| 2011/0268101 A1 | 11/2011 | Wang et al. |
| 2012/0115518 A1 | 5/2012 | Zeira et al. |
| 2012/0207080 A1 | 8/2012 | Chang et al. |
| 2013/0315152 A1 | 11/2013 | Ratasuk et al. |
| 2014/0010172 A1 | 1/2014 | Wei et al. |

* cited by examiner (a)

(b)

METHOD AND APPARATUS FOR GENERATING DEVICE-TO-DEVICE TERMINAL SIGNAL IN WIRELESS COMMUNICATION SYSTEM

CROSS REFERENCE TO RELATED APPLICATIONS

This application is a Continuation of U.S. application Ser. No. 15/121,550, filed on Aug. 25, 2016, which is the National Phase of PCT International Application No. PCT/KR2015/001790, filed on Feb. 25, 2015, which claims priority under 35 U.S.C. 119(e) to U.S. Provisional Application No. 61/944,553, filed on Feb. 25, 2014, all of which are hereby expressly incorporated by reference into the present application.

BACKGROUND OF THE INVENTION

Field of the Invention

The present invention relates to a wireless communication system, and more particularly, to a method and apparatus for generating a signal in a device-to-device communication.

Discussion of the Related Art

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

SUMMARY OF THE INVENTION

The technical task of the present invention is to provide a method of generating and transmitting an automatic gain control (AGC) preamble.

Technical tasks obtainable from the present invention are non-limited by the above-mentioned technical task. And, other unmentioned technical tasks can be clearly understood from the following description by those having ordinary skill in the technical field to which the present invention pertains.

In one technical aspect of the present invention, provided herein is a method of generating a device-to-device (D2D) signal from a user equipment in a wireless communication system, including mapping a sequence for an automatic gain control (AGC) preamble to a resource element and performing an inverse fast Fourier transform (IFFT) on the mapped AGC preamble, wherein the sequence for the AGC preamble is repeated N times (N>=0) when mapped to the resource element and wherein the N is proportional to a frequency bandwidth if the user equipment is an in-coverage user equipment.

In another technical aspect of the present invention, provided herein is a user equipment device in a D2D user equipment for generating a D2D (device-to-Device) signal in a wireless communication system, including a receiving module and a processor, wherein the processor maps a sequence for an automatic gain control (AGC) preamble to a resource element and performs an inverse fast Fourier transform (IFFT) on the mapped AGC preamble, wherein the sequence for the AGC preamble is repeated N times (N>=0) when mapped to the resource element, and wherein the N is proportional to a frequency bandwidth if the user equipment is an in-coverage user equipment.

The N may not be related to the frequency bandwidth if strength of a signal received by the user equipment from a base station is equal to or smaller than a predetermined value.

The frequency bandwidth may include a system bandwidth or a transmission bandwidth of the D2D signal.

A sequence ID for the AGC preamble may be obtained from a synchronization source of the D2D user equipment.

The sequence ID obtained from the synchronization source may be used in common by a D2D user equipment having received the AGC preamble.

When a signal transmitted after the AGC preamble is a discovery signal or a communication signal, the sequence ID may be linked to a sequence ID of a demodulation reference signal related to the discovery signal or the communication signal.

When a cyclic shift is applied to generation of the AGC preamble, the cyclic shift may be linked to a cyclic shift of the demodulation reference signal related to the discovery signal or the communication signal.

When a number of sequence IDs of the demodulation reference signal related to the discovery signal or the communication signal is greater than a number of sequence IDs for the AGC preamble, a modulo operation may be applied to the sequence ID of the demodulation reference signal related to the discovery signal or the communication signal.

A sequence ID for the AGC preamble may be used in common within a group having the D2D user equipment belong thereto.

The sequence for the AGC preamble may include a demodulation reference signal sequence.

The demodulation reference signal sequence may have a same sequence ID of a demodulation reference signal related to a signal transmitted after the AGC preamble.

The sequence for the AGC preamble may include one of a Zadoff-chu (ZC) sequence, a gold sequence and an m-sequence.

According to the present invention, when an automatic gain control (AGC) preamble generated by the present invention is used, the AGC preamble may also be used for data demodulation, and thus efficiency in the use of resources may increase.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENTS

Figure 1:
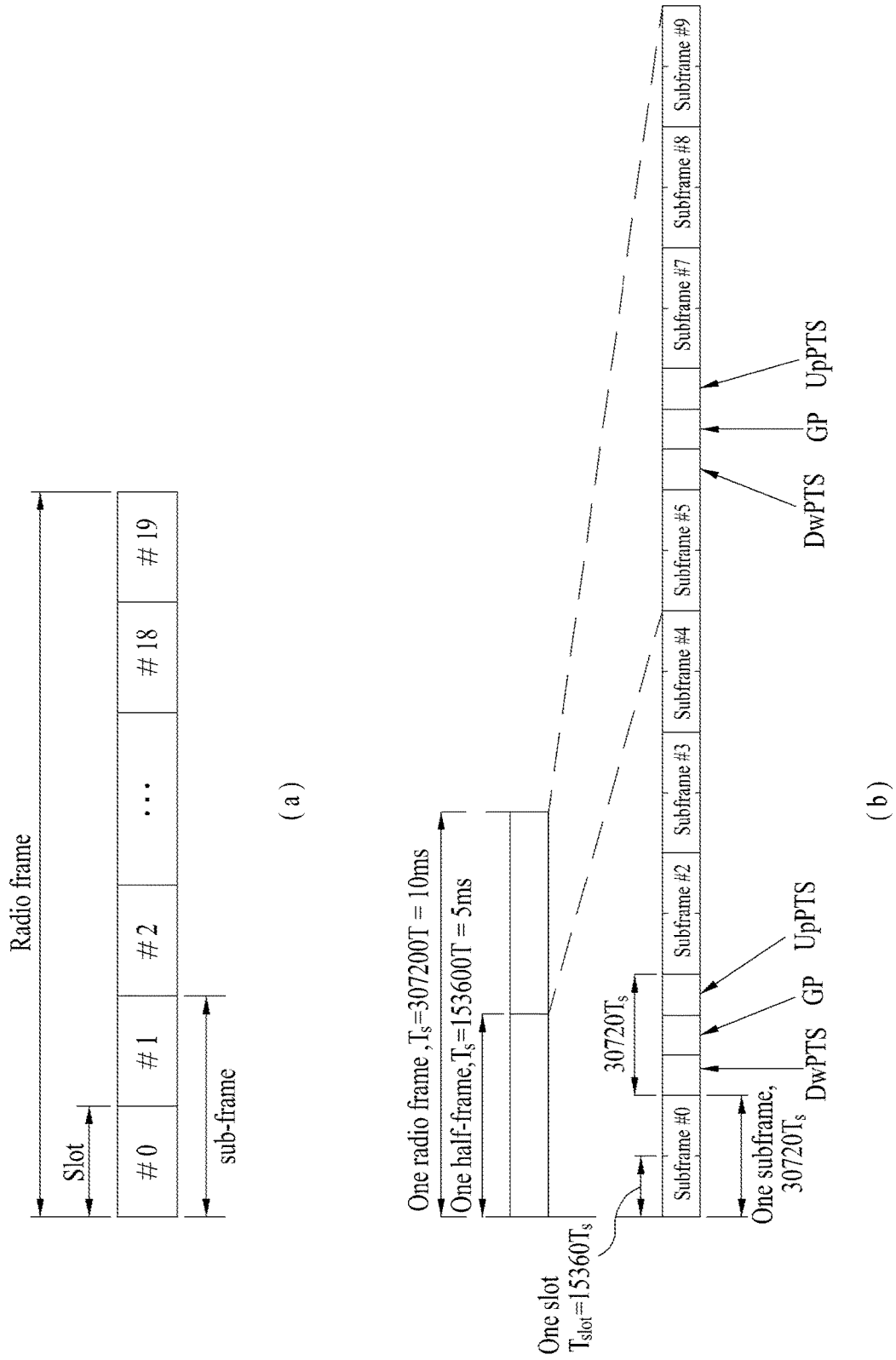
FIG. 1 is a diagram to describe a structure of a wireless frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. In addition, in the following embodiments, the term "base station" may mean an apparatus such as a scheduling node or a cluster header. If the base station or the relay transmits a signal transmitted by a terminal, the base station or the relay may be regarded as a terminal.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
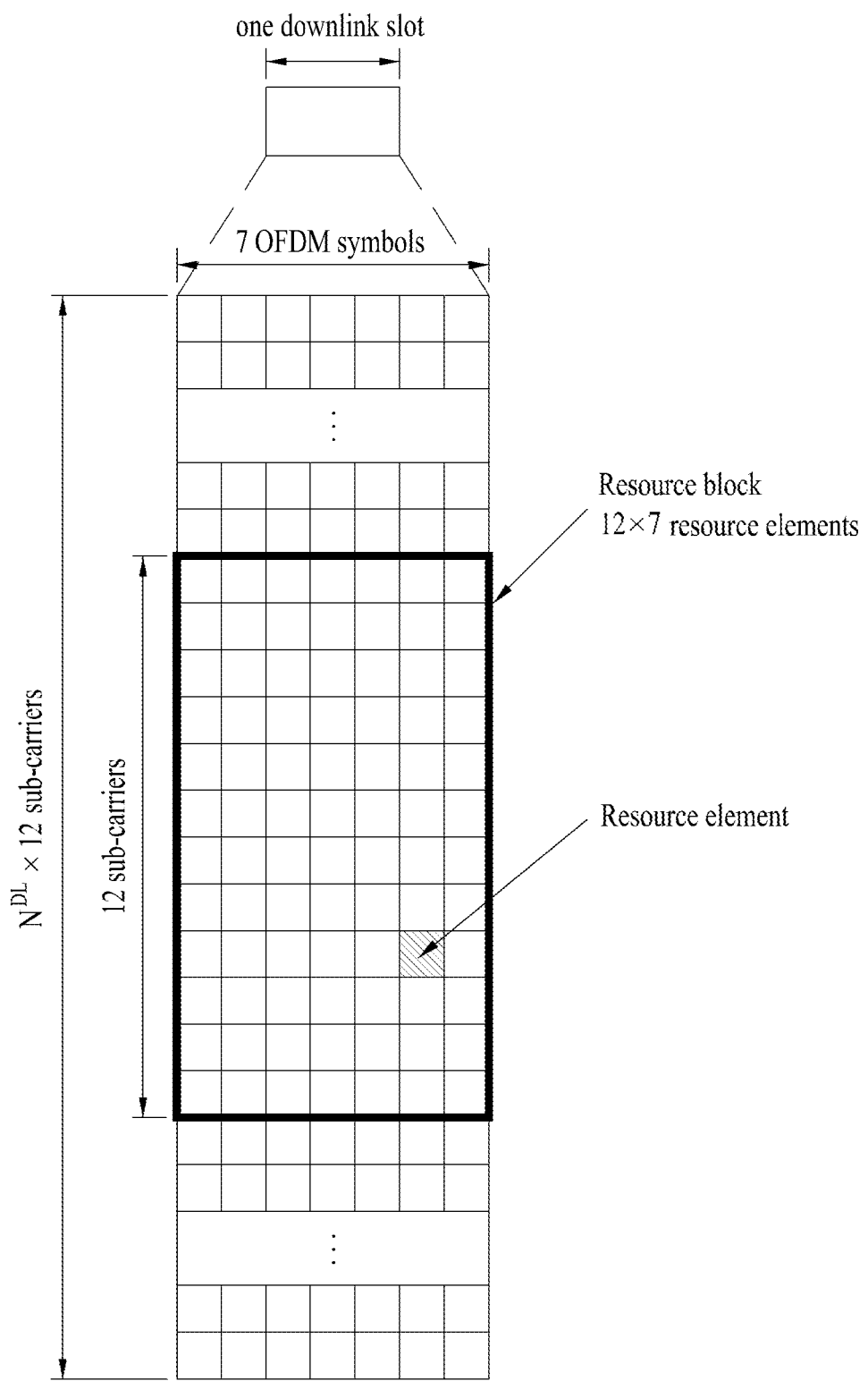
FIG. 2 is a diagram to describe a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
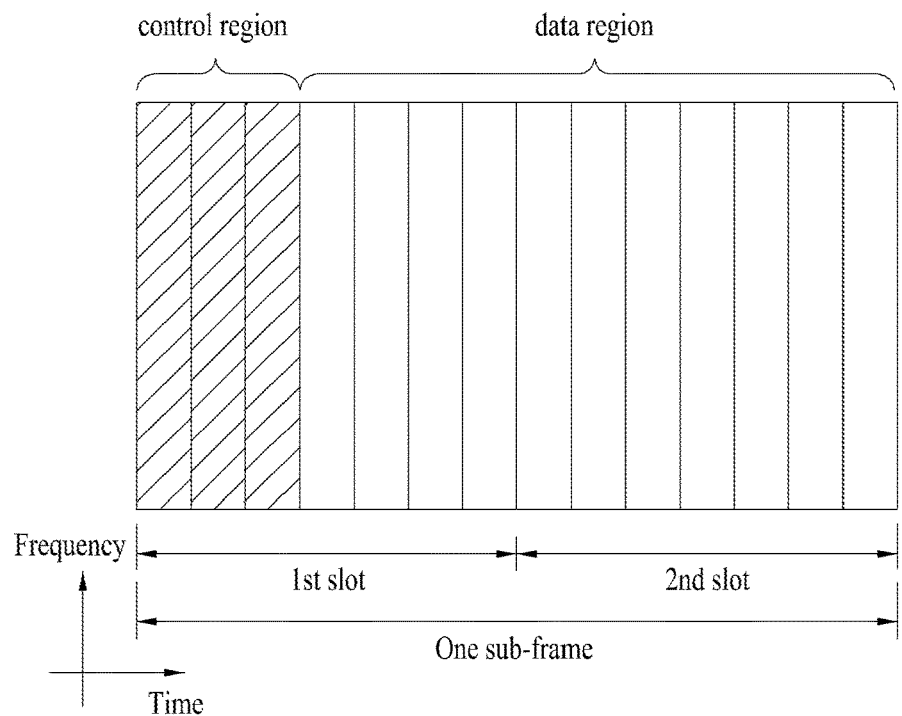
FIG. 3 is a diagram to describe a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
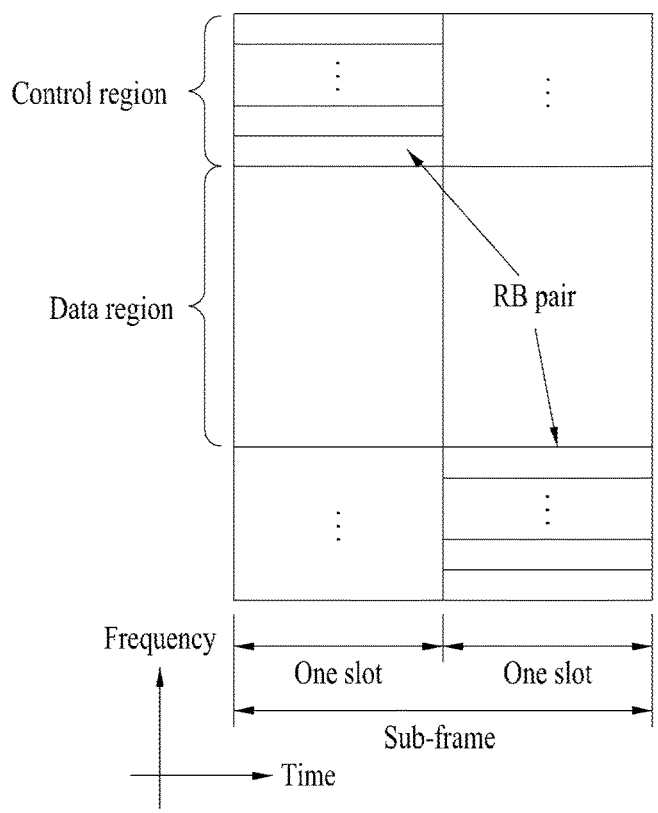
FIG. 4 is a diagram to describe a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Acquisition of Synchronization of D2D UE

Hereinafter, acquisition of synchronization between UEs in a D2D communication will be described based on the above description and the existing LTE/LTE-A system. In an OFDM system, when time and frequency are not synchronized, a multiplexing between different UEs in the OFDM signal may become impossible due to an inter-cell interference. Individual synchronization of all UEs by direct transmission and reception of synchronization signals of the UEs is inefficient. Therefore, in a distributed node system such as D2D, a certain node may transmit a representative synchronization signal and the remaining UEs may be synchronized according thereto. Namely, a scheme where some nodes (at this time, a node may also be referred to as an eNB, an UE, a synchronization reference node (SRN) or a synchronization source) transmit a D2D synchronization signal (D2DSS) for transmission and reception of a D2D signal and the remaining UEs are synchronized according thereto so as to transmit and receive the signal may be used.

The D2D synchronization signal may include a primary D2DSS (PD2DSS) and a secondary D2DSS (SD2DSS). The PD2DSS may be of a structure similar to/modified from a Zadoff-chu sequence or a PSS of a predetermined length or a repeated structure thereof. The SD2DSS may be of a structure similar to/modified from M-sequence or SSS or a repeated structure thereof. If UEs are synchronized from an eNB, SRN becomes the eNB, and D2DSS becomes the PSS/SSS. A physical D2D synchronization channel (PD2DSCH) may be a (broadcast) channel through which basic (system) information (e.g., information related to D2DSS, a duplex mode (DM), TDD UL/DL configuration, resource pool-related information, D2DSS-related application type, and the like), which the UE first needs to know, is transmitted. The PD2DSCH may be transmitted on the same subframe as in the D2DSS or a subframe following the D2DSS.

A SRN may be a node that transmits a D2DSS and a PD2DSCH. The D2DSS may be of a certain sequence form or may be a sequence indicating certain information or of a codeword form after going through a predetermined channel coding. In this case, the SRN may be an eNB or a specific D2D UE. In the case of a partial network coverage or out-of-network coverage, the UE may become the SRN. Further, in the case of an intercell discovery, the UE may relay a D2DSS at the point of time when a certain offset is added to the point of time when adjacent cell UEs receive from the SRN in order for the UEs to recognize the timing. Namely, the D2DSS may be relayed through a multi hop. If the relayed UEs are plural or there are a plurality of clusters around, the UE receiving the D2DSS may observe a plurality of D2DSS and may receive a D2DSS having different hops.

As described above, such information as types of applications related to the D2DSS, DM, and the like may be transmitted through the PD2DSCH. However, in some cases, it may be necessary to indicate DM, types of applications related to the D2DSS, a CP length, and the like by using a scheme other than the PD2DSCH. For example, in a partial network coverage scenario, UEs out of coverage may not know whether the DM of the base station operating in an adjacent area is TDD or FDD. If the UEs out of coverage indiscreetly perform D2D communication without knowing the DM, reception of the downlink signal of the cell boundary UE may be seriously interfered. Therefore, the D2D terminal should recognize the DM of the cell, which may be directed on the PD2DSCH. Only, there may be a case where the reception of PD2DSCH is difficult (e.g., a case where different PD2DSCHs are transmitted on the same time resource, and thus the PD2DSCH cannot be appropriately restored, and the like). Hence, the DM may be directed through the structure of the synchronization signal as will be described below. As another embodiment, the types of applications related to the D2D synchronization signal (in this case, the types of application may include a public safety, a D2D communication for a specific purpose, and the like) may be indicated through the structure of the synchronization signal. Namely, the D2DSS format may be different for each application, which will be described below in detail. In the description below, one of application 1 and application 2 may be a public safety. Further, DM1 may be TDD and DM2 may be FDD, or DM1 may be FDD and DM2 may be TDD.

Transmission of Automatic Gain Control (AGC) Preamble in D2D Communication

In the existing cellular communication, a periodically transmitted cell-specific reference signal and the like exist, and thus a separate AGC section is not necessary. However, in the D2D communication, there is no repeatedly transmitted reference signal such as a cell-specific reference signal, and thus it is necessary to include an AGC stabilization section in the initial period of the D2D signal transmission. By including the AGC stabilization section in the D2D signal transmission, in D2D communication, the UE directly transmits a signal. As such, the point of time of signal transmission, a frequency resource, and the like may be different for every subframe, thereby reducing the influence of the fluctuation of the average power.

Hereinafter, the scheme of generating an AGC preamble needed in the D2D signal transmission will be described. The description below may be applied to a UE-to-vehicle communication (e.g., a V2X and the like) as well as the D2D communication.

Structure of AGC Preamble

A D2D UE device according to an embodiment of the present invention may generate an AGC preamble by mapping a sequence for the AGC preamble to a resource element and performing an inverse fast Fourier transform (IFFT) on the mapped AGC preamble. At this time, the sequence for the AGC preamble is repeated N times when mapped to the resource element. When the UE is an in-coverage UE, the N may be proportional to the frequency bandwidth, and the frequency bandwidth may be a system bandwidth (or the transmission bandwidth of the D2D signal). If the D2D UE is an out-of-coverage UE, the N may not be related to the frequency bandwidth. If the strength/intensity/quality of the signal received by the D2D UE from a base station is equal to or smaller than a preset value, the N may not be related to the frequency bandwidth or may be a preset value. The N may be set by a network or may have been set to a certain value in advance. Further, the N may be dependent on the system frequency bandwidth. This may be selectively shown to the out-of-coverage UE. When the N is too big, the distance on the frequency axis becomes large, and thus the use for the purpose of the channel estimation becomes difficult. Hence, the N may be determined depending on the channel state report, the transmission/reception signal strength between D2D UEs, and the like.

Likewise, the D2D UE according to the above-described embodiment of the present invention sets a repeated factor to N in IFMDA as AGC preamble so as to be generated and transmitted.

Figure 5:
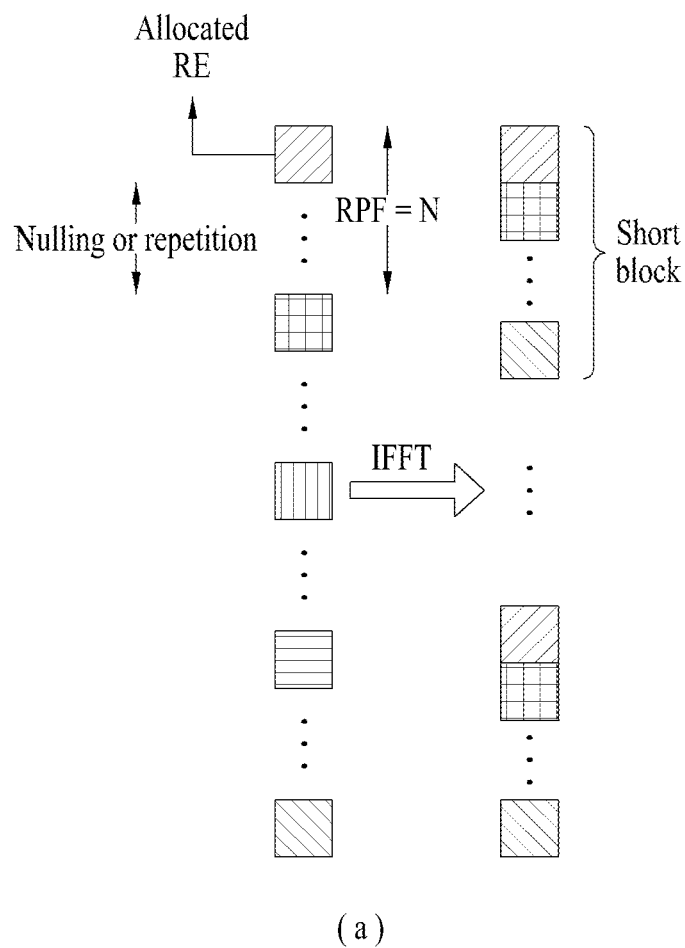
FIGS. 5 and 6 are diagrams to describe an automatic gain control (AGC) preamble according to an embodiment of the present invention.
Figure 5:
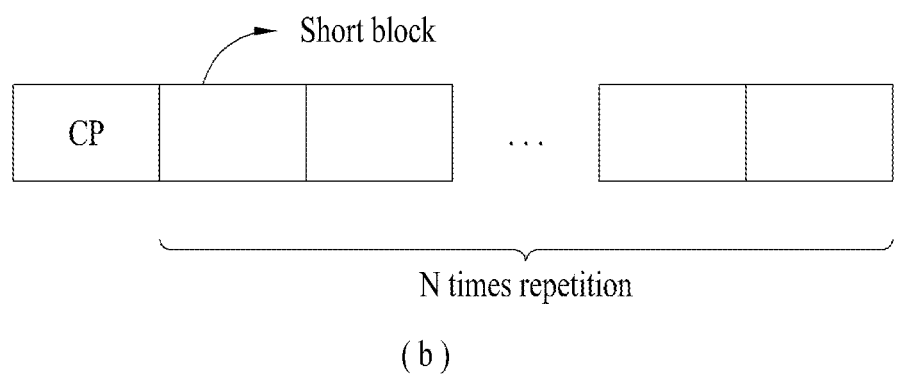

FIG. 5(a) illustrates a process of generating an AGC preamble according to an embodiment of the present invention. In FIG. 5, each block refers to an RE to which a sequence for AGC preamble is allocated. As shown in FIG. 5, when the sequence for AGC preamble is mapped to the RE, repetition of N times is applied. After the mapping, an AGC preamble may be generated by taking IFFT. As another example, nulling may be performed instead of repetition. Namely, in the frequency domain, mapping may be performed as a comb type and IFFT may be taken. In such a case, a repeated form of the same sequence may be generated in the time domain. FIG. 5(b) illustrates a generated AGC preamble. As explained above, through the repetition of N times and IFFFT, a preamble of an N-times repeated form may be generated. Namely, in the time domain, a short block is repeated N times. Further, after generating a sequence, by repeating N times in the time domain, the same effects may be shown.

In the case of generating an AGC preamble as described above, the following effects are shown. In LTE system, various frequency bandwidths of 1.4 MHz to 20 MHz for respective carriers are supported. In this case, the length of the section needed in the AGC may be different depending on the frequency bandwidth. When it is assumed that the number of samples needed in AGC for estimation of stable average receiving power is fixed, the sampling rate becomes different depending on the frequency bandwidth, and thus the length of the section needed for AGC may become different. As the frequency bandwidth decreases, the sampling rate decreases, whereby the section length needed for the AGC may increase. On the other hand, as the frequency bandwidth increases, the sampling rate increases, whereby the section length needed for the AGC may decrease. Further, the length of the preamble needed in the AGC section may be fixed irrespective of the frequency bandwidth. For example, one OFDM symbol is fixed and may be used in the transmission of the AGC preamble. When the frequency bandwidth is large and the length of the preamble used in the AGC section is fixed, the time section other than the section needed for the AGC (the section needed for turning AGC) may be used for other purposes (e.g., a synchronization fine tuning, supplementary DMRS, and the like). Namely, when part of the short length is used in the AGC and the AGC stabilization section is short depending on the frequency bandwidth, the signal may be restored in the frequency domain without ICI by using complete blocks of the remaining area except the AGC. Further, even when only part of the preamble is received through the above-described AGC generation method, restoration may be possible in the frequency domain without inter carrier interference (ICI).

Figure 6:
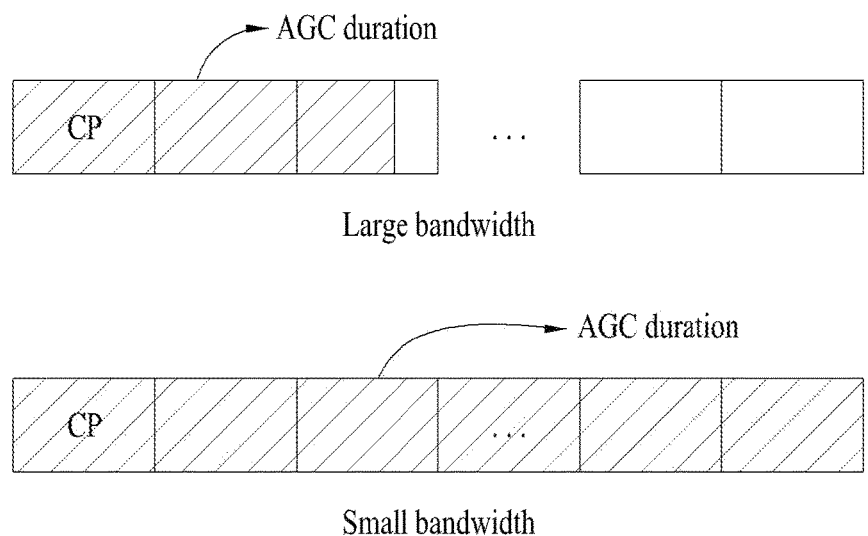

In terms of a receiving UE, the receiving operation of the UE may be different depending on the frequency bandwidth. When the frequency bandwidth is large, the AGC section becomes short, and thus if FFT is taken by copying other completely received blocks except the short block received in the time domain to the non-received area, the symbol may be completely restored in the frequency domain. FIG. 6 explains that the restoration operation may be different depending on the frequency bandwidth. In the small frequency bandwidth, one symbol is entirely used as AGC, but in a large bandwidth, only some samples are used, and completely received part among the remaining areas is copied and then FFT is taken so that the signal may be restored without ICI in the frequency domain.

Continually, the method of generating an AGC preamble according to another embodiment of the present invention will be described.

A single tone signal may be used as the AGC preamble. Namely, each UE may load information on only one RE in the symbol to be used as the AGC (e.g., an on/off keying or a BPSK/QPSK symbol) and may fill the remaining area with 0s. Thereafter, the power applied to the symbol is scaled to be the same as the transmitting power so as to be transmitted. Such a single tone signal is an extreme constant envelope signal and may show the best performance in estimating the average power. The power applied to the single tone is preferably the same as the power applied to the D2D signal. Yet, when the ratio is informed to the receiving UE in advance or the power is applied in a predetermined ratio, another power may be set. At this time, with respect to the location of RE transmitted by each UE, all UEs may use a predetermined location or the locations of REs transmitted by respective UEs may be different. In particular, when the locations of the REs are different for respective UEs, the receiving UE may recognize the received power and the frequency at the reception, and thus estimation of the average receiving power becomes simple. Namely, if the receiving UE takes correlation from the frequency tone (RE) having the possibility of appearance of a single tone so as to be combined, the average power may be easily estimated. The location of the RE transmitted for each UE may be a value linked to the CS or ID of the later transmitted sequence. For example, if the DMRS is later transmitted and the CS is UE-autonomously set, the RE location of the AGC preamble may have been transmitted from the RE location of the CS value (if CS is 4, the single tone is transmitted in RE 4 times).

As another example, a plurality of short preambles may be transmitted in the time domain. Short preambles are repeatedly transmitted in the time domain. At this time, the total length of the AGC preamble may be the length of one OFDM symbol. In the frequency domain, the frequency domain signal of the short preamble in the time domain may be placed away by N RE. The advantage of such a scheme is that if a preamble is transmitted in the time domain and the preamble has a constant envelope, a constant envelope signal is shown in the time domain, and thus the average power estimation in the time domain can be easily performed.

PSS or SSS may be used as the AGC preamble. This is a scheme that may be particularly used for D2D synchronization signal (D2DSS). When the D2DSS is transmitted as a plurality of PSSs, one of the PSSs or SSSs may be used as the AGC preamble. At this time, the sequence ID of the PSS or the SSS may be one of the IDs of later-transmitted PSSs or SSSs or may be a certain ID which has been set differently in advance.

As another example, a DMRS sequence may be used as an AGC preamble. Namely, when a discovery or communication signal is transmitted, a DMRS sequence may be transmitted to a first symbol. At this time, the sequence ID and CS of the DMRS sequence of the AGC preamble may be the same as those of the later DMRS, or the sequence ID of the DMRS sequence may be the same as that of the later DMRS, but the CS of the DMRS sequence may be different from that of the later DMRS. Such a linked relation may have been predetermined, or the CS of the AGC preamble may be set through the modulo operation of the DMRS or a predetermined function.

Sequence ID of AGC Preamble

As explained above, the sequence ID of the generated AGC preamble may be set as follows.

The sequence ID for the AGC preamble may have been obtained from the synchronization source of the D2D UE. Namely, the sequence ID may be a synchronization source ID. This scheme may be applied when the synchronization source transmits a D2DSS. Further, the ID linked with the ID of the synchronization source having the UE belong thereto may be used as the ID of the AGC preamble even when a discovery, communication, and scheduling assignment (SA) are transmitted. In such a case, the sequence ID obtained from the synchronization source may be used in common by the D2D UE receiving the AGC preamble. Namely, UEs belonging to the same synchronization cluster may use the same IE as the AGD preamble sequence ID. Yet, in this case, there is a possibility that a distorted average power may be estimated due to the offset interference of the channel. In order to prevent such a distortion, the ID of the sequence transmitted after the AGC preamble may be linked to the ID of the AGC preamble sequence. For example, when the signal transmitted after the AGC preamble is either a discovery signal or a communication signal, the sequence ID may be linked to the sequence ID of the demodulation reference signal related to the discovery signal or the communication signal. In the case of the discovery, the DMRS is to be transmitted. There is a possibility that the cyclic shift (CS) of the DMRS is autonomously set by the UE so as to be transmitted. When the cyclic shift is applied to the generation of the AGC preamble, the cyclic shift may be linked to the cyclic shift of the demodulation reference signal related to the discovery signal or the communication signal. When the number of CSs of the AGC preamble is different from the number of CSs of the DMRS, the AGC preamble performs the modulo operation on the DMRS CS and uses the result of the operation as the CS of the sequence of the AGC preamble, or sets the CS or sequence of the AGC preamble by a predetermined mapping scheme. For example, when the number of sequence IDs of the demodulation reference signal related to the discovery signal or the communication signal is greater than the number of sequence IDs for the AGC preamble, the modulo operation may be applied to the sequence ID of the demodulation reference signal related to the discovery signal or the communication signal.

As another example, the sequence ID may be a group ID. Namely, the sequence ID for the AGC preamble may be used in common in the group having the D2D UE belong thereto.

As another example, the sequence ID may be a pre-configured ID. The AGC is an operation that is performed first before a certain signal is received, and thus it is considered that it may be difficult to obtain a certain ID. The pre-configured ID may have been set by a network or may set the sequence ID of the preamble of the AGC with a preset ID. At this time, when the same preamble is used for each UE belonging to the same synchronization cluster, a distorted average power may be estimated by the offset interference of the channel. In order to prevent such a distortion, the ID of the sequence transmitted after AGC may set to be linked to the ID of the AGC preamble sequence. For example, in the case of the discovery, the DMRS is to be transmitted, and there is a possibility that the CS of the DMRS is autonomously set and is transmitted. In this case, the ID of the preamble of the AGC or the CS of the sequence of the preamble may be linked to the CS of the DMRS. If the number of AGC preamble CSs is different from the number of CSs of the DMRS, the modulo operation may be performed for the DMRS and the result may be used as the CS of the sequence of the AGC preamble, or the CS or sequence of the AGC preamble may be set by a predetermined mapping scheme.

Further, the transmitting UE IE may be used as the sequence ID. When the signal of the AGC is transmitted, if different IDs are used for respective UEs, the offset interference of the channel when collided by using the same sequence may be prevented. Therefore, the sequence ID of the AGC preamble may use the transmitting UE ID for such a purpose.

Further, a random ID may be used. By using a random ID, UEs may have different sequence IDs, which can resolve the offset interference problem of the channel which may occur when the same sequence ID is used.

Whether the above-described embodiments are to be applied may be different depending on the synchronization, SA, D2D communication, and D2D discovery. For example, in the case of the discovery, the AGC preamble structure uses the repetition of N times, and in the case of the synchronization signal, PSS/SSS may be used.

Transmission Band of AGC Preamble

An AGC preamble may be transmitted in the same band as in a D2D signal. The AGC preamble may be a preamble transmitted on the same RB as the RB where the D2D signal is transmitted. For example, when the synchronization signal is transmitted in 6 RB in the center of the system bandwidth, the AGC preamble may also be transmitted in 6 RB in the center. As another example, when a discovery signal is transmitted in RB at a certain frequency location, the AGC preamble may be transmitted as the first symbol of a certain RB.

Further, the transmission band of the AGC preamble may set in advance (e.g., 6 RB in the center of the system bandwidth). The band where the AGC preamble is transmitted may have been predetermined or may be configured by a network. When configuration may be performed by a network, this may be an area linked to the frequency bandwidth. For example, when the frequency band is large, the area where the AGC preamble may be transmitted together as a large area, and when the frequency bandwidth is small, the area where the AGC preamble is transmitted may also be set as a small frequency bandwidth. The advantage of such a scheme is that because the band where the AGC preamble is transmitted limited, only the signal of the corresponding band may perform detection and attenuation computation. The operation of the AGC may include average power estimation, symbol detection, and attenuation computation. At this time, symbol detection and attenuation computation are performed in only the predetermined band, and thus the AGC preamble reception and adaptive operation may become simple.

Further, the sequence used in the AGC preamble may be the same sequence as the SRS or may be DMRS. Further, the sequence may also be Zadoff-chu (ZC) sequence, gold sequence, m-sequence, or the like.

At this time, the sequence ID and/or the CS used in the AGC preamble may be linked to the ID (or the seed value of the sequence) of the sequence (e.g., the synchronization sequence in the case of the synchronization signal, DMRS in the case of the discovery or communication signal) and the CS which are transmitted later. For example, the sequence ID of the AGC preamble is the same as the DMRS sequence ID, and the CS may be defined by a predetermined mapping table or may have a linked relation by the modulo operation. Further, the sequence ID of the AGC preamble is different from the ID of the sequence that is transmitted later, but a predetermined mapping function may be used.

It was assumed in the above description that the AGC preamble uses 1 OFDM symbol, but the present invention is not limited thereto. The present invention may be applicable to the case where one AGC preamble uses a plurality of OFDM symbols.

Configuration of Apparatus According to an Embodiment of the Present Invention

Figure 7:
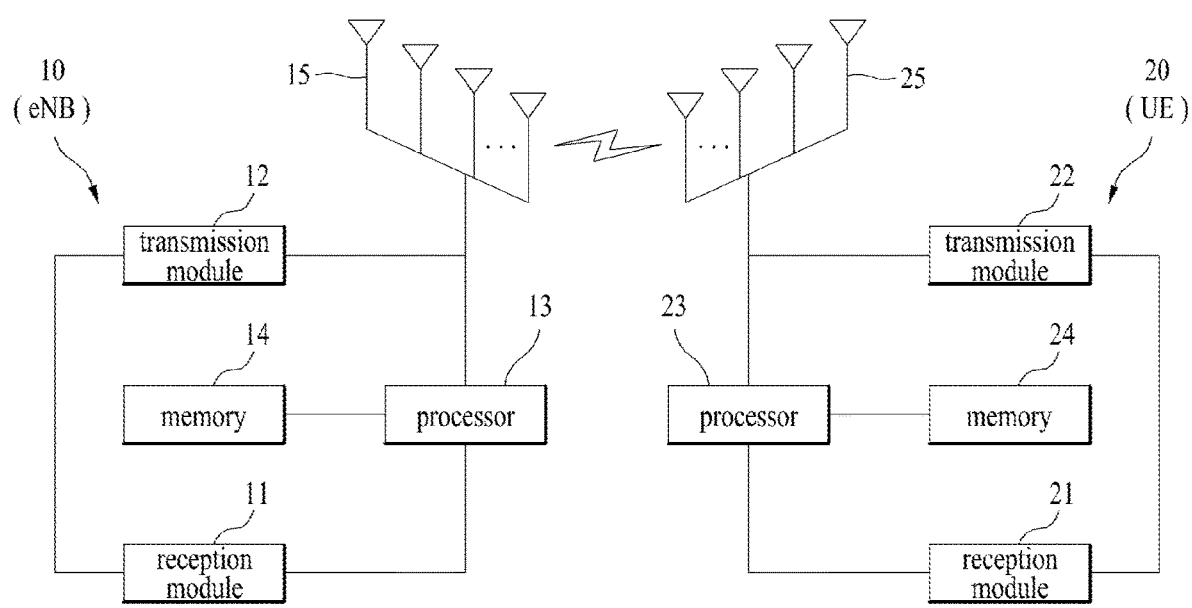
FIG. 7 is a diagram to describe a configuration of a transmitting/receiving device.

FIG. 7 illustrates a configuration of a transmitting point device and an UE device according to an embodiment of the present invention.

A transmitting point device 10 according to the present invention includes a receiving module 11, a transmitting module 12, a processor 13, a memory 14, and a plurality of antennas 15. The plurality of antennas refer to transmitting point devices supporting MIMO transmission/reception. The receiving module 11 may receive various signals, data, and information on the uplink from the UE. The transmitting module 12 may transmit various signals, data, and information on the downlink to the UE. The processor 13 may control overall operation of the transmitting point device 10.

The processor 13 of the transmitting point device 10 according to an embodiment of the present invention may process necessary matters in each of the above-described embodiments.

The processor 13 of the transmitting point device 10 additionally performs a function of performing the operation process of information received by the transmitting point device 10, information to be transmitted to the outside, and the like. The memory 14 may store the operation-processed information and the like for a predetermined time and may be substituted by a component such as a buffer (not shown).

Referring to FIG. 7 again, an UE 20 according to the present invention includes a receiving module 21, a transmitting module 22, a processor 23, a memory 24, and a plurality of antennas 25. The plurality of antennas 25 refer to UEs supporting MIMO transmission/reception. The receiving module 21 may receive various signals, data, and information on the downlink from the base station. The transmitting module 22 may transmit various signals, data, and information on the uplink to the base station. The processor 23 may control overall operation of the UE 20.

The processor 23 of the UE 20 according to an embodiment of the present invention may process matters needed in each of the above-described embodiments.

The processor 23 of the UE 20 additionally performs a function of performing the operation process of information received by the UE 20, information to be transmitted to the outside, and the like. The memory 24 may store the operation-processed information and the like for a predetermined time and may be substituted by a component such as a buffer (not shown).

Such a specific configuration of a transmitting point device and an UE may be independently applied in the above-described various embodiments or two or more embodiments may be simultaneously applied. Redundant points are omitted for clarity of description.

Further, in the description about FIG. 7, the description about the transmitting point device 10 may also be applied to the relay device as the downlink transmitting body or the uplink receiving body in the same manner. The description about the UE 20 may also be applied to the relay device as the downlink receiving body or the uplink transmitting body in the same manner.

Embodiments of the present invention may be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

The above-described embodiments of the present invention may be applicable to various mobile communication systems.

What is claimed is:

1. A method of generating a device-to-device (D2D) signal by a user equipment (UE) in a wireless communication system, the method comprising:
    mapping a sequence for an automatic gain control (AGC) preamble to a resource element; and
    generating the AGC preamble by performing an inverse fast Fourier transform (IFFT) on the sequence for the AGC preamble mapped to the resource element,
    wherein the sequence for the AGC preamble is mapped to the resource element repeatedly N times, and
    wherein the N is determined based on a frequency bandwidth related with the D2D signal.

2. The method of claim 1, wherein the sequence for the AGC preamble comprises a demodulation reference signal sequence.

3. The method of claim 2, wherein the demodulation reference signal sequence has a same sequence ID of a demodulation reference signal related to a signal transmitted after the AGC preamble.

4. The method of claim 1, wherein a UE receiving the AGC preamble acquires information on the frequency bandwidth of the D2D signal based on the N.

5. The method of claim 1, wherein a sequence ID for the AGC preamble is obtained from a synchronization source of the user equipment.

6. The method of claim 5, wherein the sequence ID obtained from the synchronization source is used in common by a user equipment having received the AGC preamble.

7. The method of claim 6, wherein when a signal transmitted after the AGC preamble is either a discovery signal or a communication signal, the sequence ID is linked to a sequence ID of a demodulation reference signal related either to the discovery signal or to the communication signal.

8. The method of claim 7, wherein when a cyclic shift is applied to generation of the AGC preamble, the cyclic shift is linked to a cyclic shift of the demodulation reference signal related either to the discovery signal or to the communication signal.

9. The method of claim 7, wherein when a number of sequence IDs of the demodulation reference signal related either to the discovery signal or to the communication signal is greater than a number of sequence IDs for the AGC preamble, a modulo operation is applied to the sequence ID of the demodulation reference signal related either to the discovery signal or to the communication signal.

10. The method of claim 1, wherein the N is determined by further considering the signal strength of the D2D signal and a channel status report.

11. The method of claim 1, wherein a sequence ID for the AGC preamble is used in common within a group having the user equipment belong thereto.

12. The method of claim 1, wherein the sequence for the AGC preamble comprises one selected from the group consisting of a Zadoff-chu (ZC) sequence, a gold sequence and an m-sequence.

13. A user equipment device for generating a device-to-device (D2D) signal in a wireless communication system, the user equipment device comprising:
a receiving module; and
a processor,
wherein the processor maps a sequence for an automatic gain control (AGC) preamble to a resource element and generates the AGC preamble by performing an inverse fast Fourier transform (IFFT) on the sequence for the AGC preamble mapped to the resource element,
wherein the sequence for the AGC preamble is mapped to the resource element repeatedly N times, and
wherein N is determined based on a frequency bandwidth related with the D2D signal.

* * * * *